Dec. 27, 1966          M. S. TWETEN                3,294,214
                      CONVEYOR DEVICE
Filed Jan. 4, 1965                          4 Sheets-Sheet 1
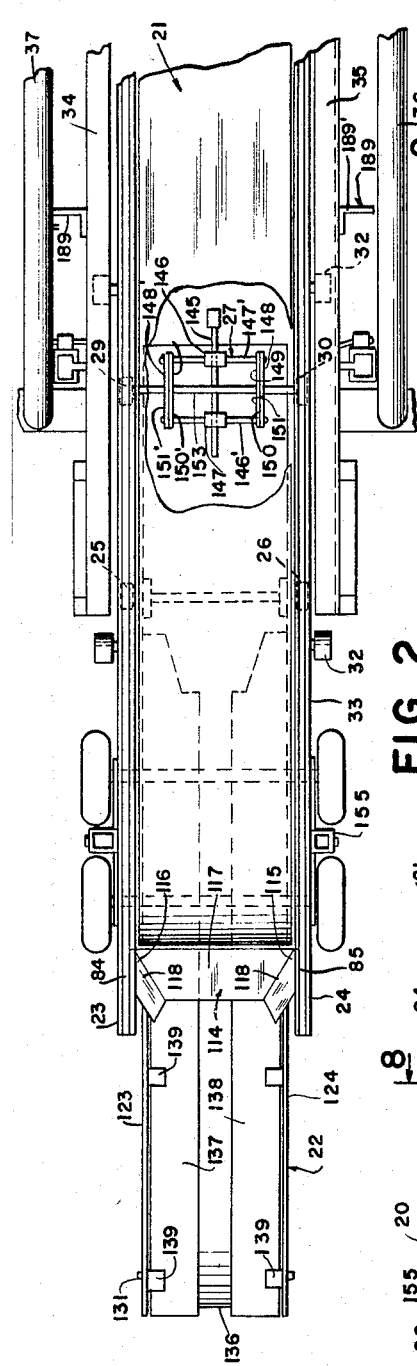
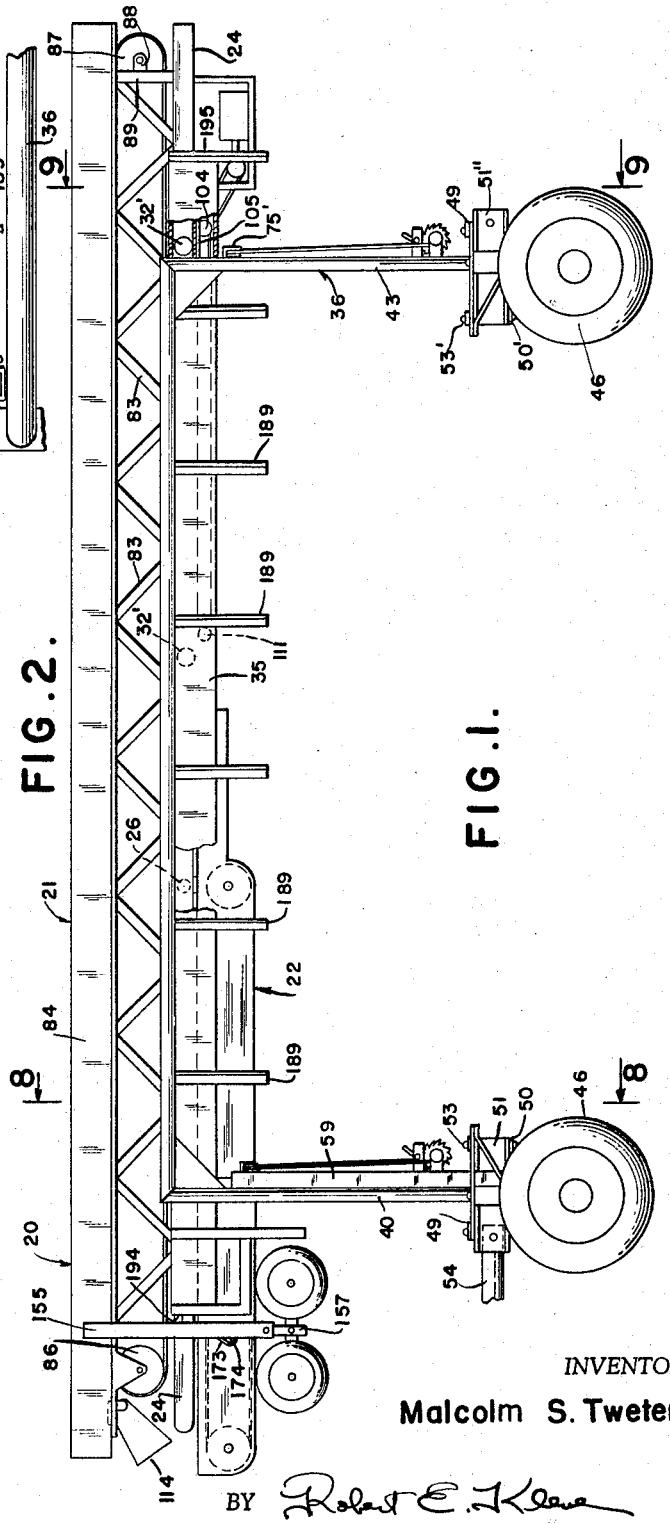
INVENTOR
Malcolm S. Tweten
BY *Robert E. Kleve*
ATTORNEY Dec. 27, 1966 M. S. TWETEN 3,294,214
CONVEYOR DEVICE
Filed Jan. 4, 1965 4 Sheets-Sheet 2
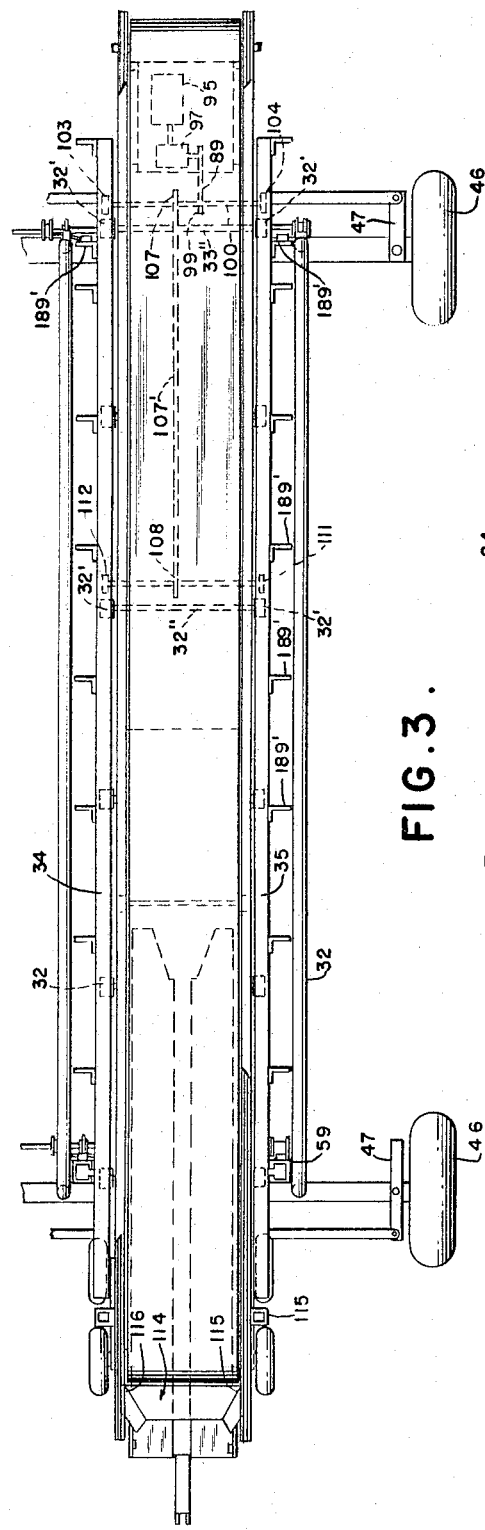
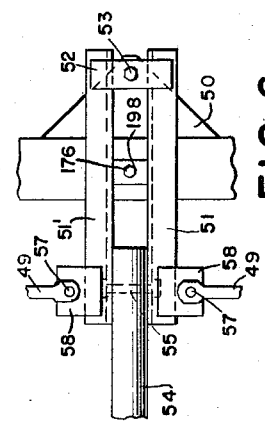
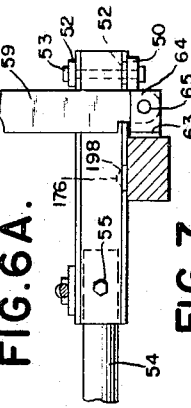
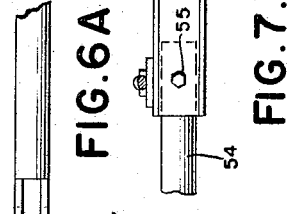
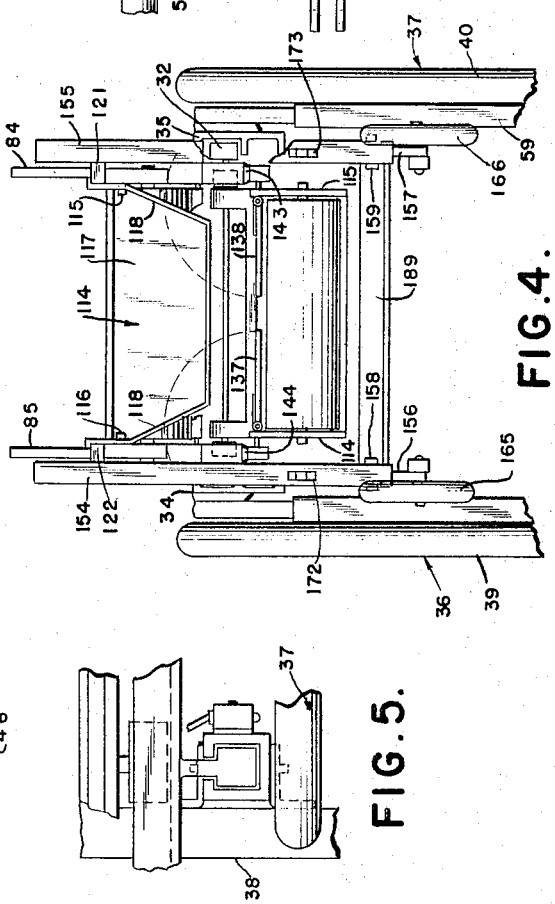
INVENTOR
Malcolm S. Tweten
BY
ATTORNEY Dec. 27, 1966  M. S. TWETEN  3,294,214
CONVEYOR DEVICE
Filed Jan. 4, 1965  4 Sheets-Sheet 3
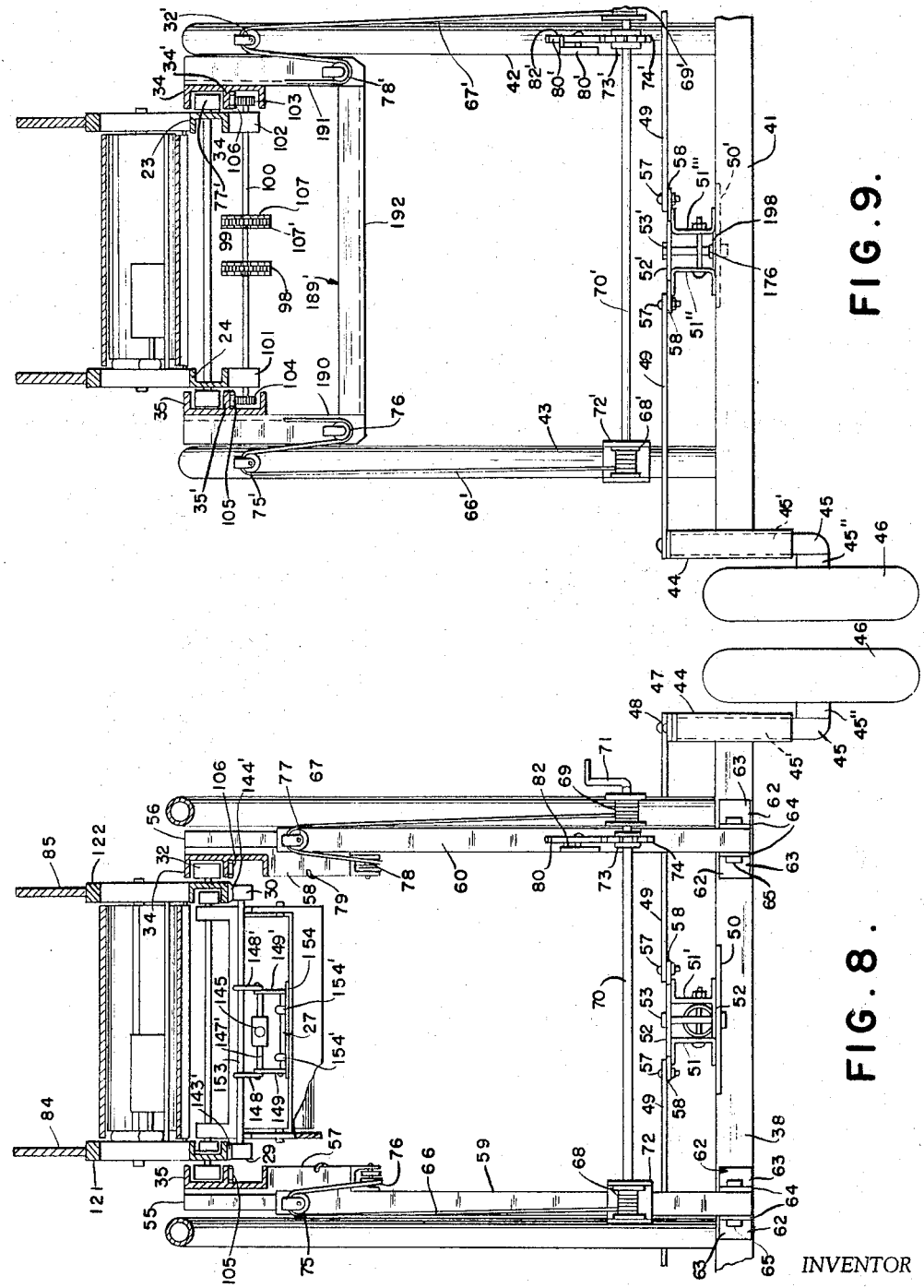
INVENTOR
Malcolm S. Tweten
BY *Robert E. Kleeve*
ATTORNEY

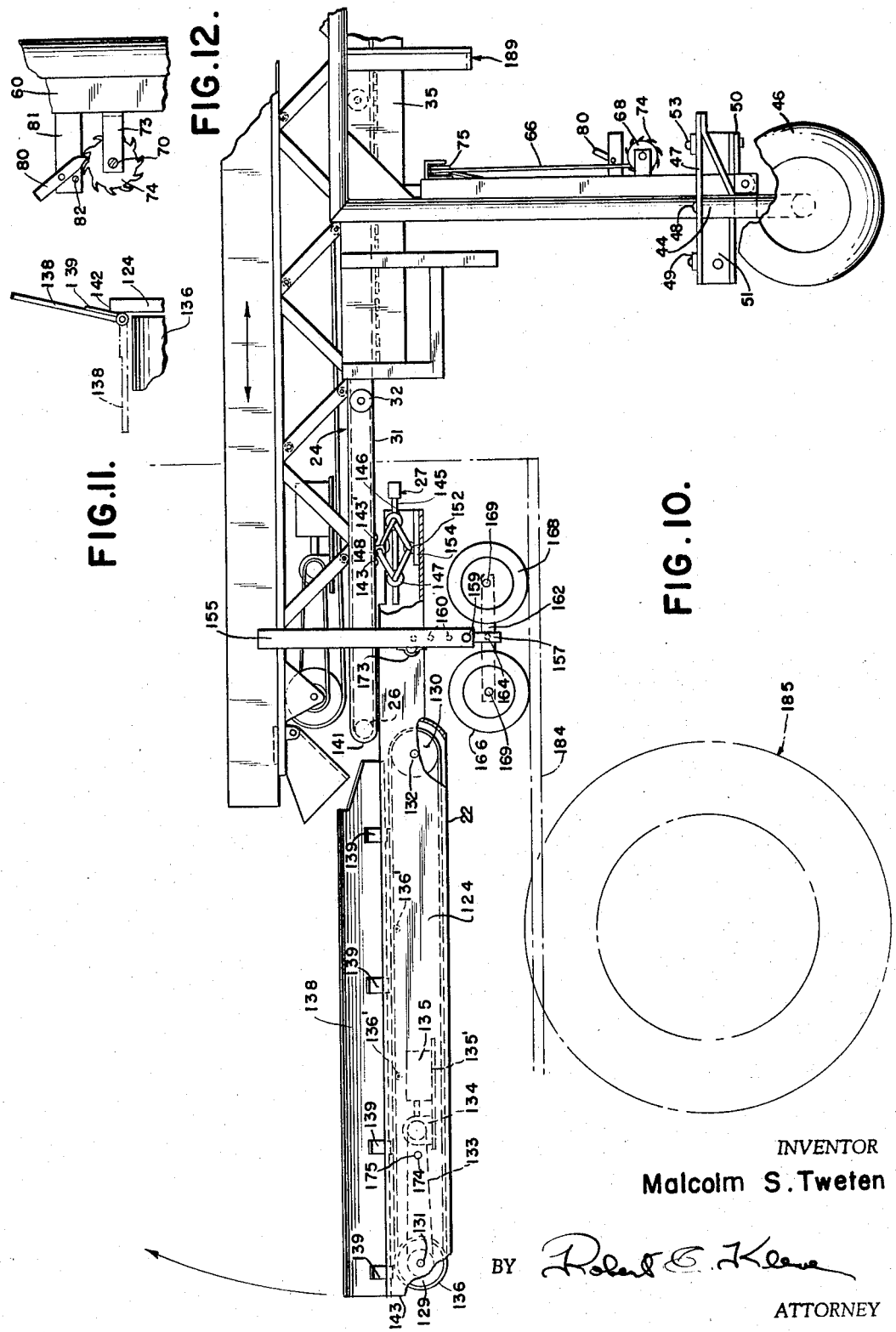

United States Patent Office 3,294,214
Patented Dec. 27, 1966

3,294,214
CONVEYOR DEVICE
Malcolm S. Tweten, Buxton, N. Dak. 58218
Filed Jan. 4, 1965, Ser. No. 423,001
4 Claims. (Cl. 198—89)

This invention relates to conveyor apparatus more particularly the invention relates to apparatus and equipment for conveying and loading materials and commodities of various types.

It is an object of the invention to provide a novel portable conveying device which may be towed from place to place and has telescoping conveyors for loading the box of a truck from the rear end.

It is a further object of the invention to provide a novel conveying device which may be adapted for various types of conveying operations.

It is a further object of the invention to provide a novel conveying device having an outer wheel support for supporting a telescoping conveyor, and having a novel pivotally adjustable conveyor.

Further objects and advantages of the invention will become apparent as the description proceeds and when taken in conjunction with the accompanying drawings wherein:

FIGURE 1 is a side elevational view of the novel conveying invention.

FIGURE 2 is an enlarged top fragmentary view of the conveying invention with the upper and lower conveyors partially extended.

FIGURE 3 is a top plan view of the conveying invention.

FIGURE 4 is an enlarged fragmentary front view of the conveying invention disclosing the front end of the conveyor and the short conveyor underneath, and also showing the front end of the dolly wheel structure.

FIGURE 5 is an enlarged fragmentary view of the manner of attachment of the main conveyor to the E-frame or subframe and the manner of attachment of the subframe to the sleeves of the main frame.

FIGURE 6 is an enlarged fragmentary view of the construction of the front channel members and their associated structure including their attachment to the frame, the rods, and towing rod.

FIGURE 6A is an enlarged fragmentary view of the forward end of the towing rod.

FIGURE 7 is a side elevational view of the front channel members and associated structure.

FIGURE 8 is a cross-sectional view taken along line 8—8 of FIGURE 1.

FIGURE 9 is a cross-sectional view taken along line 9—9 of FIGURE 1.

FIGURE 10 is an enlarged side view of the forward end of the conveyor invention illustrating the conveyor invention in operative position for loading the box of a truck.

FIGURE 11 is an enlarged fragmentary view taken along line 11—11 of FIGURE 9 and illustrating the locking gear and construction for raising and lowering the E-frame members to an adjusted position.

FIGURE 12 is an enlarged fragmentary view of one of the pivoted side flanges of the short or output conveyor.

Briefly stated, the invention comprises a conveyor device having a long main conveyor with a short conveyor mounted beneath it. Both conveyors are movable so as to be projected forwardly relative to the main framework. The main framework of the conveyor device is mounted upon four wheels so that it may be moved readily from place to place. The main conveyor has a four wheeled dolly mounted to its forward end so that the main conveyor may be projected forward into the box of a truck-trailer for loading the trailer or box with the dolly riding upon the floor of the trailer to support the main conveyor. The short conveyor may be projected forward so that nearly all of the short conveyor projects forward of the forward edge of the main conveyor whereupon the short conveyor may be pivoted upward and lowered to facilitate the loading of the trailer.

With further more detailed reference to the drawings in FIGURE 1 the conveyor device is illustrated and referred to by numeral 20. The conveyor device 20 has a main conveyor 21 of a length of approximately 30 feet, with a lower relatively short conveyor 22 of approximately 12 feet mounted beneath. The main conveyor carries the short conveyor 22 by means of a pair of elongater channel members 23 and 24 which have a U-shaped cross-section and are welded to the bottom of the main conveyor 21. The short conveyor 22 has a pair of rollers 25 and 26 which project above the conveyor 22. The rollers 25 and 26 ride in the channels of channel members 23 and 24 respectively.

Thereby suspending the short conveyor beneath the main conveyor 21. The short conveyor has a scissors jack 27 which is pivotally mounted to the rear 28 of the short conveyor. The scissors jack 27 has a pair of rollers 29 and 30 (FIGURES 2, 8, and 10) which rollers 29 and 30 ride along the bottom 31 of the channel members 23 and 24 and thereby maintain the short conveyor in parallelism with the main conveyor.

The main conveyor also has a plurality of rollers 32 which are mounted along the outer face 33 of the channel members 23 and 24. The rollers 32 ride in the upper channels 34' and 35' of the pair of elongated subframe members 34 and 35. The elongated members 34 and 35 each has an E-shaped cross-section, and the E-shaped members are fixed together in parallel relation by a plurality of U-shaped brace member 189. Each U-shaped member 189 has one leg 190 welded to E-shaped member 34 and the other leg 191 welded to E-shaped member 35. The U-shaped braces have an L-shaped cross-section. The U-shaped braces have a base portion 192 which connects the legs 190 and 191 together.

*Main frame and wheel assembly*

The pair of main frame members 36 and 37 are tubular and of an inverted U-shape. A front transverse elongated bar member 38 is welded to the bottom of the front legs 39 and 40 of the main frame members 36 and 37. An elongated rear transverse bar member 41 is welded to the rear legs 42 and 43 of the members 36 and 37.

At the outer ends of both the front and rear transverse bar members 38 and 41 are vertical collars 44 fixed thereto. Each vertical collar has an L-shaped cylindrical rod 45 with one leg 45' rotatably mounted about the vertical axis of said collar.

Four wheels 46 are mounted to one of the four legs 45" of the L-shaped rods, respectively, so as to rotate about a horizontal axis. Four elongated plates 47 are fixed to the upper ends of each of the four legs 45' of the L-shaped rods, by means of a bolt 48. Four tie rods 49 are pivotally connected at their outer ends to the outer ends of the plates 47.

A pair of triangular plates 50 and 50' are welded to the middle of the front transverse bar member 41, respectively. A pair of U-shaped channel members 51 and 51' are fixed together by plates 52 in parallel relation. A bolt 53 passes through an aperture in the triangular plate 50 and through plates 52 of the U-shaped channel member whereby the pair of channel members 51 and 51' on the front transverse bar member may pivot in fixed relation about the axis of the bolt 53. A similar pair of channel members 51" and 51''' are fixed together by plates 52' and a bolt 53' passes through the plate 52' and the triangular plate 50' whereby the channel members 51" and 51''' of the rear transverse bar member may pivot in fixed relation about the axis of bolt 53'.

A cylindrical rod 54 may be pivotally mounted to either the pair of channel members 51 and 51', of the front transverse bar member, or pivotally mounted to the similar pair of channel members 51" and 51''' of the rear transverse bar member by means of a bolt 55 which passes through an aperture in the channel members and rod, so that the cylindrical rod may pivot about the horizontal axis of bolt 55 and about the vertical axis of bolt 53 when attached to the front channel members 51 and 51', or may pivot about the horizontal axis of bolt 55' and vehicle axis of bolt 53' when attached to the rear channel members.

The front two of the four rods 49 at their inner ends are pivotally connected to the channel members 51 and 51', the rear pair of the tie rods 49 are pivotally connected at their inner ends to the rear channel members 51" and 51''', by means of bolts 57 which pivotally connect the tie rods to plates 58 and which plates 58 are fixed to the channel members 51 and 51' and 51" and 51'''. Whereby when the towing rod 54 is attached to the front channel member and is pivoted to the left or right about bolt 53 this turns the front wheels either to the left or right. Likewise when the towing rod 54 is attached to the rear channel member and is pivoted to the left or to the right this turns the rear wheels in the same manner.

*Raising and lowering structure for the conveyors*

The main conveyor 21 and the short conveyor 22 are raised and lowered by the E-shaped members. The E-shaped members are in turn raised and lowered at their forward ends by a pair of rectangular bars 55 and 56 which are fixed to the E-shaped frame members 34 and 35 respectively in perpendicular relation. Narrow plate portions 57 and 58 are welded to the rectangular bars 55 and 56, respectively, and are welded to the E-shaped members 34 and 35 to provide the fixed connection between the E-shaped members and the rectangular bars.

The rectangular bars are slidably mounted in rectangular sleeves 59 and 60, which sleeves each has longitudinal slots 61 for the plate portions 57 and 58 to project through. The sleeves provide a guide for the bars 55 and 56 to travel along with the plate portions riding in the slots. The rectangular sleeves 59 and 60 are pivotally mounted to front transverse bar member 38 by L-shaped lugs 62 each having one leg 63 welded to the bar member 38 and the other leg 64 having a bolt 65 passing through the legs 64 and through rectangular sleeves to provide the pivotal connection.

Cables 66 and 67 attached at one end to the plate portions 57 and 58 and at the other ends are wound on spools 68 and 69 respectively. A rod 70 having a handle 71 at one end has the spools 68 and 69 fixed thereto. U-bracket 72 is welded to the rectangular sleeve 59 and supports the rod 70 and the spool 68 at one end of the rod, having apertures for the rod to pass through. U-bracket 73 is welded to the sleeve 60 and support the toothed gear 74, which gear is fixed to the rod 70 thereby supporting the rod 70. The U-bracket 73 also has apertures for the rod 70.

The cable 66 extends up from the spool 68 through a pulley 75 which is fixed to the sleeve 59 and through pulley 76 which is fixed to the lower end of the plate 57, whereupon the end of the cable is attached to the plate 57.

The cable 67 similarly has its one end wound about the spool 69 and its other end extending upward through a pulley 77 fixed to the sleeve 60 and on through a pully 78 fixed to the plate portion whereafter the end 79 of the cable is fixed or tied to the plate portion 58, by turning the handle 71 counterclockwise when the rod 70 is viewed from FIGURE 1, this rotates the rod 70 which draws the cables 66 and 67 downward thereby raising the plate portions 57 and 58 and the rod members 55 and 56 upward relative to the sleeves 59 and 60, thereby raising the E-shaped members 34 and 35 upward thereby raising the rollers of the main conveyor as well as the main short conveyor upward relative to the sleeves 59 and 60 and the rest of the main frame.

The toothed gear 74 has a lever 80 (see FIGURES 8, 10, and 12) which is pivotally mounted to a plate 81. The plate 81 is welded to the sleeve 60. The plate 81 also has a projecting pin 82 lying in the path of the rotation of the lever 80 to limit its clockwise movement when viewed from FIGURE 12. When the E-frame has been raised or lowered to the desired height by the operator, the operator pivots the lever 80 between the teeth of the gear 74 thereby locking the gear 74 against counterclockwise movement when viewed from FIGURE 12, and thereby preventing the cable from unwinding and the E-members from lowering so as to lock the E-members and the conveyors at their desired position.

The rearward portions of the E-members 34 and 35 are raised and lowered by the same type of cable winding structure as the front portions of the E-members. The rear portions are, however, free of any positive connection with the main frame members except by pulley and cable.

The rearward cable winding structure includes a pair of U-brackets 72' and 73' which are fixed to the rear legs 43 and 42 respectively of the main frame. A pair of spools 68' and 69' are fixed to a rod 70'. The spool 68' is disposed between the U-brackets 72', and the rod is rotatably mounted to the U-brackets 72' and 73'. A tooth gear 74' is also fixed to the rod 70' and disposed between the bracket 73'. A lever 80' is pivotally mounted to a plate 81' which is fixed to the leg 42 and a stop 82' on the plate 81' limits the movement of the lever 80' so that the lever and gear operate in the same manner as the lever 80 and gear 74.

A pair of cables 66' and 67' are wound on spools 68' and 69'. The cable 66' extends up from spool 68' around pulley 75', which pulley is fixed to leg 43 and around pulley 76', which is fixed to a U-member 189' which is directly between the rear legs 42 and 43, and thereafter the cable 66' is tied to the U-member at 193. Likewise cable 67' extends up from spool 69' and around pulley 77' which is fixed to leg 42 and then around pulley 78' which is fixed to U-member 189' and thereafter the cable is tied to U-member 189' at 194. A handle (not shown) rotates rod 70' counterclockwise (as viewed from FIGURE 1) to wind cables 66' and 67 onto spools 72' and 73' and thereby draw U-member 189' upward. The U-member 189' having its legs welded to the E-members. Thereby draws the rear of the E-members upward. The lever 80' is used to lock the gear 74' and thereby lock the E-members in their adjusted position. Reversing the rotation of rod 70' lowers the E-members.

*The main conveyor*

The main conveyor 21 has a plurality of diagonal braces 83 which are fixed to the channel members 23 and 24 and project diagonally upward. A pair of elongated members 121 and 122 are fixed to the top of the diagonal braces, along each side and a pair of upright flanges 84 and 85 are fixed along the top of elongated members 121 and 122. At opposite ends of the main conveyor are a pair of rotatably mounted drums 86 and 87. Drum 86 is rotatably mounted to flanges 88 which project downward from the upright flanges 84 and 85. Drum 87 is rotatably mounted to a pair of flanges 88 which project downward from elongated members 121 and 122. Drum 87 is rotatably mounted to a pair of flanges 89 which project from a vertical brace 89' on opposite sides of the rear of the main conveyor.

An endless conveyor belt 90 extends around the drums 86 and 87 and a plurality of small rollers 91 are rotatably mounted in the diagonal braces. The rollers 91 support the intermediate upper and lower belt portions 90′ and 90″ of the belt in parallelism.

The forward drum 86 of the main conveyor is driven by a belt 92 which in turn is driven by a pulley of a drive reduction mechanism 93 which in turn is driven by an electric motor 94. The forward drum 86, in turn, drives the endless belt to convey material placed on the top of the conveyor belt from the rear of the conveyor to the front of the conveyor. The motor 94 and a drive reduction mechanism 93 are mounted on a platform 94′ which is fixed between the diagonal braces 83 of the conveyor.

The main conveyor is moved forward and rearward along the E-members by means of an electric motor 95 which is mounted to a platform 96 at the rear of the conveyor. The electric motor drives a gear reduction mechanism 97 which in turn drives an output tooth gear which drives an endless link chain 98. The chain 98 drives a toothed gear 99 fixed to a rod 100. The rod 100 is rotatably mounted to lugs 101 and 102 fixed to the bottom of the channel members 23 and 24. A pair of toothed gears 103 and 104 are fixed to the outer ends of the rod 100 and the tooth gears 103 and 104 are lengths of link chains 105 and 106, respectively. Link chains 105 and 106 are fixed to the bottom of the middle legs 34′ and 35′ of the E-members 34 and 35, respectively, and extend from the front ends 194 to the rear ends 195 of the E-members 34 and 35.

A gear 107 is fixed intermediate to the rod 100 and another endless chain 107′ transmits drive from the gear 107 to a gear 108. The gear 108 is fixed to a rod 109 and the rod 109 is rotatably supported by another pair of lugs fixed to the under side of the U-members 23 and 24, respectively and similar to lugs 101 and 102. A pair of toothed gears 112 and 113 are fixed to the outer ends of the rod 109 and also engage the two lengths of link chain 105 and 106 respectively. Thus, the toothed gears 103, 104, 112, and 113 engage the link chain 105 and 106 fixed to the underside of the middle leg of the E-shaped members to move the main conveyor 21 forward and rearward relative to the E-shaped members and the main frame.

A trough plate 114 is pivotally mounted to the forward end of the main conveyor 21 by pins 115 and 116. The trough plate has a tapered base 117 and a pair of outwardly diverging side flanges 118 formed integrally with the base 117, and a pair of outturned flanges 119 and 120 formed integrally with the side flanges 118 which rest upon the ledges formed by members 121 and 122 of the main conveyor 21. The trough plate acts to guide the material onto the short conveyor as it is fed off the forward and of the main conveyor.

*The short conveyor*

The short conveyor 22 has a pair of side plates 123 and 124 which acts as side housings for the conveyor. An elongated brace 125 extends across the top of the conveyor near the rear end of the conveyor and connects the plates 123 and 124 together. The brace 125 has a pair of lugs 126 and 127 which project above the brace and a rod 128 is rotatably mounted in the lugs 126 and 127. The rollers 25 and 26 are fixed to the outer ends of the rod 128.

The short conveyor 22 has a front cylindrical drum 129 and a rear cylindrical drum 130 which is rotatably mounted in the side plates 123 and 124 by pins 131 and 132. The front drum 129 is driven by a belt 133 and the belt 133 is driven in turn by the output pulley of a drive reduction mechanism 134, and the drive reduction mechanism is driven by an electric motor 135 with the drive reduction reducing the speed of the drive transmitted from the motor. The motor 135 and drive reduction mechanism 134 rest upon a platform 135′ fixed between the upright plates 123 and 124. An endless belt 136 is mounted over the drums 129 and 130 and is driven by the front drum 129. Small rollers 136′ are rotatably mounted in the plates 123 and 124 to support the upper belt portion of belt 136. Rollers may be provided to support the lower belt portion.

A pair of side flanges 137 and 138 are pivotally mounted to the upper edges of the plates 123 and 124 by means of hinges 139. The side flanges 137 and 138 are pivoted downward into their horizontal position (shown in solid lines in FIGURE 4) so that the short conveyor 22 may be slid under the main conveyor to the position shown in FIGURES 1 and 3.

When using the short conveyor 22, it is slid forward from its position shown in FIGURES 1 and 3 along a rectilinear path with the rollers 25 and 26 riding along the channels 23 and 24 until the rollers abut the rounded end flanges 140 and 141 of the channel members 25 and 26 as shown in FIGURE 10.

When the short conveyor has been moved to the position shown in FIGURE 10 relative to the main conveyor, the side flanges 137 and 138 are free to and may be pivoted upward to their position shown in dashed lines in FIGURE 4 and shown in solid lines in FIGURES 10 and 11. When the side flanges 137 and 138 are in the upward position they rest against the edge 142 of the side plates 123 and 124 and in a slightly outwardly inclined position with gravity maintaining them in this position. The flanges 137 and 138 when in the upward position act to keep material on the belt 136 of the short conveyor as it is moved by the belt from the rear of the short conveyor 22 to the front of the short conveyor until it is fed off the forward end 143 of the short conveyor.

A dual pair of lugs 143, 143′, 144, and 144′ are fixed to the bottom of the channel members 23 and 24, and the rollers 29 and 30 fit between the lugs 143 and 143′, 144, and 144′, respectively, when the short conveyor is in its position shown in FIGURE 10, relative to the main conveyor and the jack 27 has raised the rollers 29 and 30. When the short conveyor is being moved rectilinearly relatively to the main conveyor, the jack 27 is lowered so that the rollers 29 and 30 clear the lugs 143, 143′, 144, and 144′.

The scissors jack 27 is of a conventional character having a threaded rod 145 which is threaded along one end half inverse relation to the other end half. The rod 145 is threaded into threaded collars 146 and 147 of the rods 146′ and 147′. Plates 148, 148′, 149, and 149′, 150, 150′, 151, and 151′ are pivotally connected to the rods 146′ and 147 at their outer ends, and pivotally connected to a rod 152 and rod 153 at their inner ends. The rod 152 is pivotally connected to the platform 154 mounted to the rear of the short conveyor by lugs 154′. The rod 153 has the rollers 29 and 30 fixed to its outer end, thus, when the rod 145 is turned in one direction this causes the outer ends of the plates 148, 148′, 149, 149′, 150, 150′, 151, and 151′ to pivot together thereby forcing the bottom rod 152 and the rear of the platform downward and forcing the rod 153 upward and the rollers 29 and 30 against the underside of the channel members 23 and 24 and between the lugs 143, 143′, 144, and 144′. This rotating of the rod 145 causing the plates to pivot together causes the rear of the short conveyor to pivot downward about the axis of the rollers 25 and 26, thereby raising the front 143 of the short conveyor upward.

Turning the rod 145 in the opposite direction thereafter causes the short conveyor to be pivoted back onto parallel position relative to the main conveyor.

*Dolly structure*

A pair of rectangular elongated tubes 154 and 155 are welded to the U-shaped channel members 23 and 24 and the longitudinal members 121 and 122 of the main conveyor so as to be fixed to the main conveyor frame and move with it. A pair of rectangular rods 156 and 157 are slidably mounted in the rectangular tubes 154 and 155 and a pair of bolts 158 and 159 are threaded into apertures 160 in the rods 156 and 157 and through apertures in the tubes 154 and 155 to secure the rods in a desired position relative to the tubes. The rods 156 and 157 have several apertures 160 aligned in a row along the length of the rods so that the rods may be adjusted upward and downward relative to the tubes.

At the bottom of the rods 156 and 157 are a pair of elongated members 161 and 162 which are pivotally mounted at their centers to the rods 156 and 157 by bolts 163 and 164. At the outer ends of the rods 161 and 162 are four wheels 165, 166, 167, and 168 which are rotatably mounted to the rods 161 and 162 by pins 169. An elongated brace 170 extends laterally between the front wheels 165, and 166 to connect the front wheels together and a similar brace 171 extends laterally between the rear wheels 167 and 168 to connect the rear wheels together.

Rectangular tubes 154 and 155 each has a U-shaped bracket 172 and 173 which is fixed to the tubes 154 and 155. A rod 174 passes through a bore 175 in the front plates 123 and 124 and through the U-shaped brackets 172 and 173 to lock the short conveyor 22 to the tubes 154 and 155 in its retracted position as shown in FIGURE 1. When it is desired to project or slide the short conveyor forward for use, the rod 174 is merely removed.

*Operation*

When the conveyor device is to be towed from place to place the E-members 34 and 35 are lowered by cranking handle 71, clockwise when viewed from FIGURE 1, thereby rotating rod 70 clockwise with lever 80 released. This loosens or feeds out the cable 66 and 67 lowering the front end of the E-members, by allowing the rectangular bar 55 and 56 to slide downward.

The rear end is also lowered at the same time by another operator turning a similar handle (not shown) which rotates rod 70' allowing cables 66' and 67' to feed out and loosen which allows U-shaped member 189', to which the E-members are fixed, to lower thereby lowering the rear portions of the E-members.

The lowering of the front and rear portions of the E-members 34 and 35 thereby lowers the main conveyor and short conveyor. The conveyors and E-members may be lowered to a desired position so that the center of gravity of the conveyor device is closer to the ground. This reduces the likelihood of the conveyor device tipping over while being towed, since with these members lowered it is not as top heavy.

The conveyor device 20 may be towed from place to place either from the front or rear end of the conveyor. When the conveyor device is towed from the front, the rod 54 is attached to channel members 51 and 51' by the bolt 55, as shown in FIGURE 1. Alternatively, by attaching the rod 54 to the hear pair of channel members 51'' and 51''' by bolt 55', the conveyor device may be towed from the rear.

A bolt 176 may be inserted in plate 198 between the channel members 51'' and 51''', when towing the conveyor from the front, so that the rear wheels will not turn to either the left or right. Alternatively, a bolt may be inserted in plate 198' between channel members 51 and 51', when towing the conveyor device from the rear.

The forked outer end of the towing rod 54 has a pair of apertures 178 and 179 so that a bolt from the hitch of the towing vehicle may be passed therethrough.

A pair of pins 180 and 181 are welded to the legs of the U-shaped member 189 and project downward, so that when the E-members are lowered, the pins may project into apertures in the lugs 182 and 183 fixed to the rear legs 42 and 43 of the frame to thereby lock the E-members in their lowered position.

When it is desired to use the conveyor device 20 for loading the box or trailer 184 of a truck or semi 185, the conveyor is rolled on its wheels 46 over to a position directly behind the open rear end 187 of the trailer 184 of the semi, see FIGURE 10. The conveyor and E-members are raised to the position shown in FIGURE 10, by cranking the handles of the rods 70 and 70' until the lower edges of the four wheels 165–168 inclusive, of the dolly are in horizontal alignment with the top of the floor 188 of the trailer 184 of the truck.

Thereupon the rod 174 is removed and the electric motor 95, which is reversible, is plugged into a source of electric current and the operator activates the forward winding of the motor 95 by a conventional switch to drive gears 111, 112, and 103, and 104 to drive and move the main conveyor 21 forward from its position shown in FIGURE 1, relative to the E-members and main frame, to its position shown in FIGURE 10.

Thereafter the short conveyor 22 is pulled or slid forward relative to the main conveyor to its position shown in FIGURE 10, and the flanges 137 and 138 are pivoted upward. The motor 135 of the short conveyor is connected to a source of electric current to drive the belt 136 of the short conveyor, and the motor 94 of the main conveyor is connected to a source of electric current to drive the belt of the main conveyor.

The forward winding of the motor 95 may be again activated to move the main conveyor still further forward until the front end 143 of the short conveyor is closely adjacent the front end of the box of the trailer.

Thereupon, various commodities such as potatoes and the like may be loaded onto the belt 90 near the rear of the main conveyor by suitable means, and the belt 90 of the main conveyor will convey the potatoes forward to the front of the main conveyor, where they will drop down on the trough 114 and onto the belt 136 of the short conveyor near the rear end of the short conveyor and the belt 136 of the short conveyor will convey the potatoes to the front end 143 of the short conveyor where they will drop a short distance to the floor of the box of the trailer. As a pile of potatoes begins to build up the rod 145 of the scissors jack 27 will be turned to compress the outer ends of its plates (148–151, and 148'–151' inclusive) together and thereby raising the front end 143 of the short conveyor to keep it just above the top of the pile.

As the front end of the box begins to fill up with potatoes, the rear winding of the motor 95 will be activated which causes the main conveyor to back gradually back toward and onto the E-frame and main frame of the device. The main conveyor will be backed up short distances each time as the trailer fills up more and more from front to rear.

The main conveyor 21 can be driven forward by motor 95 until only gears 103 and 104 remain on the E-members and thereby engaged to the chains 105 and 106. Thus over three fourths of the length of the main conveyor may be projected or driven forward beyond the forward end of the E-members 34 and 35, and may be driven back by motor 95, since only gears 103 and 104 need to be engaged to drive the conveyor.

While the suggested length of the main conveyor is approximately 30, which means that it may be used to load rather long trailers or boxes of the type used by tractor trailers or semis, it may be desirable to lengthen the main conveyor to 35 feet, for example, so that the main conveyor may project into even longer boxes.

The rollers 32' are similar to rollers 32, and serve to support the main conveyor and are rotatably mounted to channel members 23 and 24, however, rollers 32' being adjacent gears 111 and 112 also serve to raise the main conveyor into alignment and thereby raise the gears 111 and 112 into engagement alignment with the link chain. Thus, when the front gears 111 and 112 have been run off the front open end of the E-members when the main conveyor has been projected forward this far, upon backing the conveyor rearward the rollers 32' will engage the front edge of the middle leg and roll into the upper channel thereby assuring the proper engagement of the gears 111 and 112 with the link chain.

A rod 196 connects the front pair of rollers 32′ together and a rod 196′ connects the rear pair of rollers 32′ together.

The dolly wheels 165–168 will ride along the floor 188 of the trailer box as the main conveyor 21 moves forward providing an outboard support for the main conveyor 21, so that, the conveyor device will not tip forward when the main conveyor has been projected sufficiently forward to create a weight imbalance. Thus, the dolly wheels prevent a weight imbalance, caused by the main conveyor moving forward, from tipping the device, and eliminate the need for weighing the main frame to counter balance the device.

The front sleeves 59 and 60 are pivotally mounted to the front transverse bar 38, so that the conveyor and E-frame may be pivoted to an angle relative to the ground. Thus, by turning rod 70′, the rear of the E-members may be pivoted upward at an angle to the horizontal top rod portion 197, so that the front of the E-members are lower than their rear with respect to the horizontal plane of rod portion 197. Also the E-members may be pivoted downward at an angle.

It will be obvious that various changes and departures may be made in the invention without departing from the spirit and scope thereof, and accordingly it is not intended that the invention be limited to that specifically described in the specification or illustrated in the drawings but only as set forth in the appended claims wherein, what is claimed is:

1. A conveyor apparatus comprising a frame, a first conveyor mounted to said frame, means for mounting said first conveyor for movement relative to said frame, means for moving said conveyor forward of said frame, a second conveyor beneath said first conveyor and movable therewith and movable relative to said first conveyor and said frame so as to project forwardly of said first conveyor, said second conveyor being pivotally mounted to said first conveyor, jack means positioned at the upstream end of said second conveyor to pivot said second conveyor about a horizontal axis, whereby said second conveyor when projected forward of said first conveyor is adapted to pivot about said horizontal axis.

2. A conveyor apparatus according to claim 1 wherein said first conveyor has a pair of wheels at its forward end which are movable with said first conveyor and which are disposed intermediate the height of said frame.

3. A conveyor apparatus according to claim 2 wherein said second conveyor has a pair of folding walls which are adapted to swing open when said second conveyor is projected forward of said first conveyor to provide a channel for said second conveyor.

4. A conveyor apparatus comprising a frame, a first conveyor mounted to said frame, a second conveyor having its downstream end positioned below and pivotally connected to said first conveyor and projecting forwardly of said first conveyor and frame, jack means adjacent said upstream end of said second conveyor to pivot said second conveyor upward and downward relative to said first conveyor, said second conveyor being relatively short with respect to said first conveyor, means for mounting said first conveyor for movement forward and rearward relative to said frame and carry said second conveyor with said first conveyor, said forward end of said second conveyor being free of any support, power means to move said first conveyor forward and rearward relative to said frame.

References Cited by the Examiner
UNITED STATES PATENTS

| | | | |
|---|---|---|---|
| 2,631,715 | 3/1953 | Vickers | 198—139 |
| 2,646,162 | 7/1953 | Brunsvold | 198—204 |
| 2,760,617 | 8/1956 | Bowen | 198—139 |
| 3,006,454 | 10/1961 | Penn | 198—89 |

SAMUEL F. COLEMAN, *Primary Examiner.*

RICHARD E. AEGERTER, *Examiner.*